United States Patent
Grandy (10) Patent No.: US 6,456,293 B1
(45) Date of Patent: Sep. 24, 2002

(54) METHOD AND APPARATUS FOR WORKING WITH CONSTRAINED COLOR ON A COMPUTER TERMINAL DISPLAY

(76) Inventor: James C. Grandy, 1618A Denniston Ave., Pittsburgh, PA (US) 15217

( * ) Notice: Subject to any disclaimer, the term of this patent is extended or adjusted under 35 U.S.C. 154(b) by 0 days.

(21) Appl. No.: 09/458,412

(22) Filed: Dec. 10, 1999

Related U.S. Application Data (60) Provisional application No. 60/111,875, filed on Dec. 11, 1998.

(51) Int. Cl.[7] ............................. G03F 3/08; G09G 5/02; H04N 1/46
(52) U.S. Cl. ..................... 345/591; 345/590; 345/600; 345/604; 348/645; 348/650; 358/518; 358/519; 358/520; 382/162; 382/167
(58) Field of Search ................. 348/645, 646, 348/649, 650–651, 661; 345/589, 590, 591, 593, 597, 600, 604–605, 659, 619, 613, 419, 427, 428, 581, 586, 606; 382/162, 163, 167; 358/517–520

(56) References Cited

U.S. PATENT DOCUMENTS

| | | | |
|---|---|---|---|
| 4,721,951 A | 1/1988 | Holler | 340/701 |
| 4,939,581 A | 7/1990 | Shalit | 358/244 |
| 4,941,038 A | 7/1990 | Walowit | 358/80 |
| 5,212,546 A | 5/1993 | Arazi et al. | 358/80 |
| 5,268,754 A | * 12/1993 | Van De Capelle et al. | 358/527 |
| 5,311,212 A | * 5/1994 | Beretta | 345/589 |
| 5,317,678 A | * 5/1994 | Okawara et al. | 345/659 |
| 5,323,249 A | 6/1994 | Liang | 358/518 |
| 5,384,901 A | 1/1995 | Glassner et al. | 395/131 |
| 5,465,104 A | 11/1995 | Munson | 345/150 |
| H1506 H | * 12/1995 | Beretta | 345/613 |
| 5,473,736 A | * 12/1995 | Young | 345/619 |
| 5,473,738 A | 12/1995 | Hamlin et al. | 395/131 |
| 5,528,261 A | 6/1996 | Holt et al. | 345/150 |
| 5,552,805 A | 9/1996 | Alpher | 345/153 |

(List continued on next page.)

FOREIGN PATENT DOCUMENTS

| | | | | |
|---|---|---|---|---|
| JP | 406078138 A | * | 3/1994 | H04N/1/40 |
| JP | 409935050 A | * | 2/1997 | G06T/1/00 |
| JP | 11041477 A | * | 7/1997 | H04N/1/60 |
| JP | 40920925 A | * | 10/1997 | H04N/1/60 |

OTHER PUBLICATIONS

Baraff. David. entitled "Curved Surfaces and Coherence for Non–penetrating Rigid Body Simulation", Program of Computer Graphics, Cornell University, Ithaca, NY 14853, Computer Graphics, vol. 24, No. 4, Aug. 1990, pp. 19–24 and 4 pgs. unnumbered.

(List continued on next page.)

*Primary Examiner*—Matthew Luu
*Assistant Examiner*—Wesner Sajous
(74) *Attorney, Agent, or Firm*—Webb Ziesenheim Logsdon Orkin & Hanson, P.C.

(57) ABSTRACT

A technique developed for simulation of constrained particle systems is applied to the visualization and manipulation of colors, both in isolation and relation to each other, in one or more color spaces. Utilizing the technique, a first color can be adjusted to a second color in a first color space subject to one or more objectives between the first and second colors in the first color space; one or more constraints for adjustment of first and second colors in the first color space; and/or one or more constraints and/or objectives between the adjustment of the first and second colors in the first color space and an adjustment of a corresponding first color in a second color space to a second color in the second color space.

25 Claims, 7 Drawing Sheets

U.S. PATENT DOCUMENTS

| | | | | |
|---|---|---|---|---|
| 5,615,312 | A | | 3/1997 | Kohler ........................ 395/109 |
| 5,754,448 | A | * | 5/1998 | Edge et al. .................. 358/516 |
| 5,786,908 | A | * | 7/1998 | Liang .......................... 358/518 |
| 5,806,081 | A | | 9/1998 | Swen et al. .................. 707/528 |
| 5,822,503 | A | | 10/1998 | Gass, Jr. et al. ............. 395/109 |
| 5,859,644 | A | | 1/1999 | Stokes et al. ................ 345/431 |
| 5,903,255 | A | | 5/1999 | Busch et al. ................. 345/150 |
| 5,909,220 | A | | 6/1999 | Sandow ....................... 345/431 |
| 5,909,291 | A | | 6/1999 | Myers et al. ................ 358/523 |
| 5,930,009 | A | * | 7/1999 | Sato et al. ................... 358/518 |
| 5,963,201 | A | | 10/1999 | McGreggor et al. ......... 345/326 |
| 6,062,137 | A | * | 5/2000 | Guo et al. ...................... 400/76 |
| 6,108,441 | A | * | 8/2000 | Hiratsuka et al. ............ 382/167 |
| 6,108,442 | A | * | 8/2000 | Edge et al. .................. 382/167 |
| 6,198,552 | B1 | * | 3/2001 | Nagae ......................... 358/518 |
| 6,259,184 | B1 | * | 7/2001 | Spaulding et al. ........... 382/167 |

OTHER PUBLICATIONS

Baraff, David, entitled "Fast Contact Force Computation for Nonpenetrating Rigid Bodies", Robotics Institute, Carnegie Mellon University, Pittsburgh, PA 15213, Computer Graphics Proceedings, Annual Conference Series, Orlando, FL, Jul. 24–29, 1994, pp. 23–34.

Baraff, David, entitled "Interactive Simulation of Solid Rigid Bodies", Carnegie Mellon University, IEEE Computer Graphics and Applications, May 1995, pp. 63–75.

Witkin, Andrew and Baraff, David, entitled "Differential Equation Basics", School of Computer Science, Carnegie Mellon University, Siggraph '97 Course Notes, Physically Based Modeling, pp. B1–B8.

Witkin, Andrew, entitled Physically Based Modeling: Principles and Practice, *Particle System Dynamics* Robotics Institute, Carnegie Mellon University, Siggraph '97 Course Notes, Cover sheet (1 p.) and pp. C1–C12.

Baraff, David, entitled Physically Based Modeling: Principles and Practice, *Implicit Methods for Differential Equations*, Robotics Institute, Carnegie Mellon University, Siggraph '97 Course Notes, Cover sheet (1 p.) and pp. E1–E4.

Witkin, Andrew, entitled Physically Based Modeling: Principles and Practice, *Constrained Dynamics*, Robotics Institute, Carnegie Mellon University, Siggraph '97 Course Notes, Cover sheet (1 p.) and pp. F1–F12.

Foley, James D., entitled "Computer grahics: principles and practice", Copyright © 1996. 1990 by Addison–Wesley Publishing Company, Inc., Cover sheet (1 p.) and pp. 471–603.

* cited by examiner

METHOD AND APPARATUS FOR WORKING WITH CONSTRAINED COLOR ON A COMPUTER TERMINAL DISPLAY

CROSS-REFERENCE TO RELATED APPLICATION

This application claims priority from U.S. Provisional Patent Application Serial No. 60/111,875, filed Dec. 11, 1998, entitled "Method and Apparatus for Working with Constrained Color on a Computer Terminal Display".

BACKGROUND OF THE INVENTION

1. Field of the Invention

The present invention relates to a color picker utilized in computer graphic art design.

2. Description of the Prior Art

Graphic art design software, such as desktop publishing software, uses advanced techniques for accurately reproducing colors. However, tools utilized by graphic art design software for editing colors, both single colors and sets of related colors, are still fairly primitive. This is true despite the existence of sophisticated color design principles in the graphic arts.

Graphic art design software for working with colors on a computer system is configured to maintain color fidelity between an input device and an output device. A color in such graphic art design software is specified as a set of coordinates in a color space. A color space is typically defined by three attributes, namely, source transform, destination transform and boundary. The source transform is an algorithm that converts a color from a first color space to a second device-neutral color space. The destination transform is an algorithm that converts a color in the second device-neutral color space into a third color space. The source transform and the destination transform coact to convert a color from the first color space to the third color space, and vice versa, via the second device-neutral color space. The most commonly used second device-neutral color space is CIE XYZ, a device-independent color space configured to represent every color perceivable by the human visual system. The boundary is an imaginary surface defining the limit of legal colors in the color space. The boundary of each color space is related to the range of colors producible by a device, such as a color monitor, color printer or color scanner, represented by the color space of the device or the limitation of human vision.

Graphic art design software includes a color picker which enables each color in an image to be adjusted. Preferably, the color picker includes an interface that displays a range of producible colors in terms of a perceptual color space. The perceptual color space can be depicted as a three-dimensional, double or dual-cone having the color white represented by a point of one cone and having the color black represented by a point of the other cone. The cone having the point representing the color white diverges conically therefrom toward the color black and the cone having the point representing the color black diverges conically therefrom toward the color white. The conical divergence of the two cones meet intermediate the points representing the colors white and black.

A color within the perceptual color space can be characterized in polar coordinates. Specifically, the perceptual color space has a central axis representing lightness which extends between the points at opposite ends of the dual-cone. The radial distance from the lightness axis represents saturation and the angle around the lightness axis represents hue.

A typical color picker enables an artist to work within the perceptual color space by providing a graphical interface that enables selection of a plane in the perceptual color space. For example, the graphical interface of one color picker enables the artist to select a desired hue by moving a slider on a hue color bar representing hue. Adjacent the hue color bar, the color picker displays the range of colors of the perceptual color space in a saturation-lightness plane for the selected hue. The artist then moves a computer icon in the saturation-lightness plane and selects a point therein corresponding to a color to be displayed in a select part of an image.

The graphical interface of another color picker includes a hue circle surrounding a triangle representing a saturation-lightness plane. In this color picker, the artist selects a desired hue by moving a computer icon to a desired position in the hue circle. Thereafter, the artist moves another computer icon in the saturation-lightness triangle and selects a point therein corresponding to a color to be displayed in a select part of the image.

The graphical interface of yet another color picker includes a slider on a lightness bar and an adjacent hue-saturation circle. In this color picker, the artist moves the slider to a desired position on the lightness bar. Then the artist moves a computer icon in the saturation-hue circle and selects a point therein corresponding to a color to be displayed in a select part of the image.

As discussed above, a second device-independent color space is utilized to transform colors from a first color space to a third color space. To change a color in the third color space utilizing a graphical interface in the first color space, two color transforms are required. Namely, a first color transform between the first color space and the second device-independent color space, and a second color transform between the second device-independent color space and the third color space. Moreover, in order to depict colors represented in the third color space in the user interface of the first color space, two additional color transforms are necessary between the third color space and the first color space. Hence, when editing colors in a third color space utilizing a graphic interface in a first color space, four color transforms are necessary between the various color spaces in order to affect a change of a color in a third color space based upon a graphical interface representation of this color in the first color space.

A problem with using prior art color pickers is that each color transform introduces numerical error into the color transformations. This error affects the fidelity of the colors displayed in the first color space or produced in the third color space. Another problem with using prior art color pickers is that they do not enable one color in a color space to be changed as a function of another color in the color space, thereby maintaining a desired relationship, i.e., hue, saturation and/or lightness, therebetween. Still another problem with prior art color pickers is that their graphical user interfaces do not permit visualization of relationships between colors in an image.

It is, therefore, an object of the present invention to overcome the above problems and others by providing a method for adjusting one or more colors in one or more color spaces utilizing techniques for modeling physical systems, e.g., a particle simulator. It is an object of the present invention to provide a method for reducing the number of color transforms over prior art color pickers. It is an object of the present invention to provide a method for relating two or more colors in one or more color spaces so that a change to one color produces a desired change to the other related colors. It is an object of the present invention to provide an apparatus for performing the foregoing methods. Still other objects of the present invention will become apparent to those of ordinary skill in the art upon reading and understanding the following detailed description.

SUMMARY OF THE INVENTION

Accordingly, I have invented a method of adjusting color in a color space of a device. The method includes adjusting a first color to a second color in a first color space and subjecting the adjustment from the first color to the second color in the first color space to (i) one or more objectives for the adjustment of the first color in the first color space to the second color in the first color space; (ii) one or more constraints for the adjustment of the first color in the first color space to the second color in the first color space; and/or (iii) one or more constraints between the adjustment from the first color to the second color in the first color space and an adjustment of a corresponding first color in a second color space to a second color in the second color space.

The step of subjecting the adjustment can include the steps of converting the adjustment from the first color to the second color in the first color space to an adjustment of the first color to the second color in the second color space and determining for the adjustments in the first color space and/or the second color space a change of the first and second colors thereof that does not violate the one or more constraints.

I have also invented a method of adjusting a color in a color space. The method includes determining a state vector including a first plurality of scalar values which define a first color in a first color space. An objective function is determined for desired change of the first plurality of scalar values. A partial derivative of the objective function with respect to a derivative of the state vector is determined to obtain an objective vector. The objective vector defines a change to the first plurality of scalar values which minimizes the objective function. The objective vector and the state vector are combined to obtain a change of the first color related to the desired change.

The method can also include mapping the first plurality of scalar values in the first color space to a first plurality of scalar values in a second color space to define a second color therein. The second color corresponds to the first color. The objective function is determined for the desired change in the first plurality of scalar values in the second color space.

The method can also include imposing a constraint on changes to the first plurality of scalar values and determining a constraint function and a constraint vector corresponding to the imposed constraint. A partial derivative of the constraint vector with respect to the state vector can be determined. The partial derivative defines a change to the state vector which does not violate the constraint function. The first plurality of scalar values can be changed as a function of the desired change to the first plurality of scalar values and as a function of the constraint vector.

The method can also include the steps of including in the state vector a second plurality of scalar values which define a second color in a second color space. A constraint function is determined between the first plurality of scalar values and the second plurality of scalar values. A partial derivative of the constraint function with respect to the state vector is determined to obtain a constraint vector which defines a change to the state vector which does not violate the constraint function. The second plurality of scalar values is changed as a function of the desired change to the first plurality of scalar values and as a function of the constraint vector whereby the second color changes as a function of the change to the first color. The first plurality of scalar values and the second plurality of scalar values can be mapped into a third color space. The constraint function can be determined between the first plurality of scalar values and the second plurality of scalar values in the third color space. The partial derivative of the constraint function is determined with respect to the first and second pluralities of scalar values in the respective first and second color spaces to obtain therefor the constraint vector which defines the change to the state vector which does not violate the constraint function between the first and second pluralities of scalar values in the third color space.

I have also invented a method of adjusting color in a color space that includes defining a first color in a first color space and defining a second color in a second color space. The first color in the first color space and the second color in the second color space are transformed into a corresponding first and second colors in the third color space. A constraint is defined between the first color and the second color in the third color space. Changing the first color in the first color space causes the second color in the second color space to change as a function of the change to the first color in the first color space and as a function of the constraint.

The method can also include determining a partial derivative of the constraint with respect to the first and second colors in the respective first and second color spaces and determining from the partial derivative of the constraint at least one change in the first and second colors in the respective first and second color spaces which does not violate the constraint. The second color in the second color space is changed as a function of the change of the first color in the first color space and as a function of the at least one change.

I have also invented a method of adjusting a color in a color space that includes determining a state vector including a first plurality of scalar values corresponding to a first color in a first color space. An objective function is determined for a desired change of the first plurality of scalar values corresponding to a desired change of the first color. An objective vector is determined from the objective function. The objective vector defines a change to the state vector which minimizes the objective function. The state vector and the objective vector are combined to obtain the desired change to the first color.

The method can also include imposing a constraint on changes to the first plurality of scalar values and determining a constraint function and a constraint vector corresponding to the imposed constraint. A partial derivative of the constraint vector with respect to the state vector can be determined. The partial derivative defines a change to the state vector which does not violate the constraint function. The first plurality of scalar values can be changed as a function of the desired change to the first plurality of scalar values and as a function of the constraint vector.

A color space constraint function can be determined between the first plurality of scalar values and a second plurality of scalar values of the state vector. The second plurality of scalar values define a second color in the first color space. A color space constraint vector is determined from the color space constraint function. The color space constraint vector defines a change in the state vector which does not violate the constraint function. The second plurality of scalar values is changed as a function of the change to the first plurality of scalar values and as a function of the color space constraint vector whereby the second color changes as a function of the desired change to the first color.

The state vector can include a third plurality of scalar values which define a third color in a second color space. A movement constraint function can be determined between the first plurality of scalar values and the third plurality of scalar values. A movement constraint vector is determined from the movement constraint function. The movement constraint vector defines at least one change in at least one of the first and third pluralities of scalar values which does not violate the movement constraint function. The third plurality of scalar values is changed as a function of the change to the first plurality of scalar values and as a function of the movement constraint vector whereby the third color changes as a function of the change to the first color.

I have also invented an apparatus for adjusting a color in a color space that includes a state vector determining means for determining a state vector including a first plurality of scalar values which define a first color in a first color space. An objective function determining means determines an objective function for a desired change of the first plurality of scalar values. An objective vector determining means determines a partial derivative of the objective function with respect to a derivative of the state vector to obtain an objective vector which defines a change to the first plurality of scalar values which minimizes the objective function. A combining means combines the objective vector and the state vector to obtain the desired change of the first color.

The apparatus can include a mapping means for mapping the first plurality of scalar values in the first color space to a first plurality of scalar values in a second color space to define a second color therein. The second color corresponds to the first color. The objective function determining means determines the objective function for the desired change in the first plurality of scalar values in the second color space.

The apparatus can include an imposing means for imposing a constraint on changes to the first plurality of scalar values. A constraint determining means determines a constraint function and a constraint vector corresponding to the imposed constraint. A partial derivative determining means determines a partial derivative of the constraint vector with respect to the state vector. The partial derivative defines a change to the state vector which does not violate the constraint function. A changing means changes the first plurality of scalar values as a function of the desired change to the first plurality of scalar values and as a function of the constraint vector.

The apparatus can include a state vector including means for including in the state vector a second plurality of scalar values which define a second color in a second color space. A constraint function determining means can determine a constraint function between the first plurality of scalar values and the second plurality of scalar values. A constraint vector determining means can determine a partial derivative of the constraint function with respect to the state vector to obtain therefor a constraint vector which defines a change in the state vector which does not violate the constraint function. A changing means can change the second plurality of scalar values as a function of the desired change to the first plurality of scalar values and as a function of the constraint vector whereby the second color changes as a function of the change of the first color.

The constraint function determining means can map the first and second pluralities of scalar values into a third color space. The constraint function can be determined between the first plurality of scalar values and the second plurality of scalar values in the third color space. The constraint vector determining means can determine the partial derivative of the mapping of the first and second pluralities of scalar values in the third color space.

I have also invented an apparatus for adjusting a color in a color space that includes a state vector determining means for determining a state vector including a first plurality of scalar values corresponding to a first color in a first color space. An objective function determining means determines an objective function for a desired change of the first plurality of scalar values corresponding to a desired change of the first color. An objective vector determining means determines from the objective function an objective vector which defines a change to the state vector which minimizes the objective function. A combining means combines the state vector and the objective vector to obtain the desired change of the first color.

The apparatus can include an imposing means for imposing a constraint on changes to the first plurality of scalar values. A constraint determining means determines a constraint function and a constraint vector corresponding to the imposed constraint. A partial derivative determining means determines a partial derivative of the constraint vector with respect to the state vector. The partial derivative defines a change to the state vector which does not violate the constraint function. A changing means changes the first plurality of scalar values as a function of the desired change to the first plurality of scalar values and as a function of the constraint vector.

A color space constraint function determining means can determine a color space constraint function between the first plurality of scalar values and a second plurality of scalar values of the state vector. The second plurality of scalar values define a second color in the first color space. A color space constraint vector determining means can determine for the color space constraint function a color space constraint vector which defines a change in the state vector which does not violate the constraint function. A changing means can change the second plurality of scalar values as a function of the change to the first plurality of scalar values and as a function of the color space constraint vector whereby the second color changes as a function of the change to the first color.

The apparatus can have an including means which includes in the state vector a third plurality of scalar values which define a third color in a second color space. A movement constraint determining means can determine at least one movement constraint function between the first plurality of scalar values and the third plurality of scalar values. A movement constraint vector determining means can determine for the movement constraint function a movement constraint vector which defines at least one change in at least one of the first and third pluralities of scalar values which does not violate the movement constraint function. The changing means can change the third plurality of scalar values as a function of the change to the first plurality of scalar values and as a function of the movement constraint vector whereby the third color changes as a function of the change to the first color.

The movement constraint determining means can map the first and second pluralities of scalar values into a third color space and can determine the movement constraint function between the first plurality of scalar values and the second plurality of scalar values in the third color space. The movement constraint vector determining means can determine the movement constraint function with respect to the mappings of the first and second pluralities of scalar values in the third color space.

I have also invented a method of adjusting a color in a color space that includes determining a state vector including a first plurality of scalar values corresponding to a first color in a first color space. The first plurality of scalar values are mapped to a second plurality of scalar values in a second color space to define a second color therein. An objective function is determined for a desired change of the second plurality of scalar values in the second color space corresponding to a desired change of the second color. An objective vector is determined from the objective function. The objective vector defines a change to the state vector which minimizes the objective function. The state vector and the objective vector are combined to obtain a change to the first color corresponding to the desired change of the second color.

Lastly, I have invented an apparatus for adjusting a color in a color space that includes a state vector determining means for determining a state vector which includes a first plurality of scalar values corresponding to a first color in a first color space. A mapping means maps the first plurality of scalar values to a second plurality of scalar values in a second color space to define a second color therein. An objective function determining means determines an objective function for a desired change of the second plurality of scalar values in the second color space corresponding to a desired change of the second color. An objective vector determining means determines from the objective function an objective vector. The objective vector defines a change to the state vector which minimizes the objective function. A combining means combines the state vector and the objective vector to obtain a change to the first color corresponding to the desired change of the second color.

BRIEF DESCRIPTION OF THE DRAWINGS

FIGS. 3a and 3b through 13a and 13b are top and side views, respectively, of the perceptual color space shown in FIG. 2 including various examples of imposed objectives and/or constraints on particles C1–C4 therein which correspond to colors of a device;

DETAILED DESCRIPTION OF THE PREFERRED EMBODIMENTS

Figure 1:
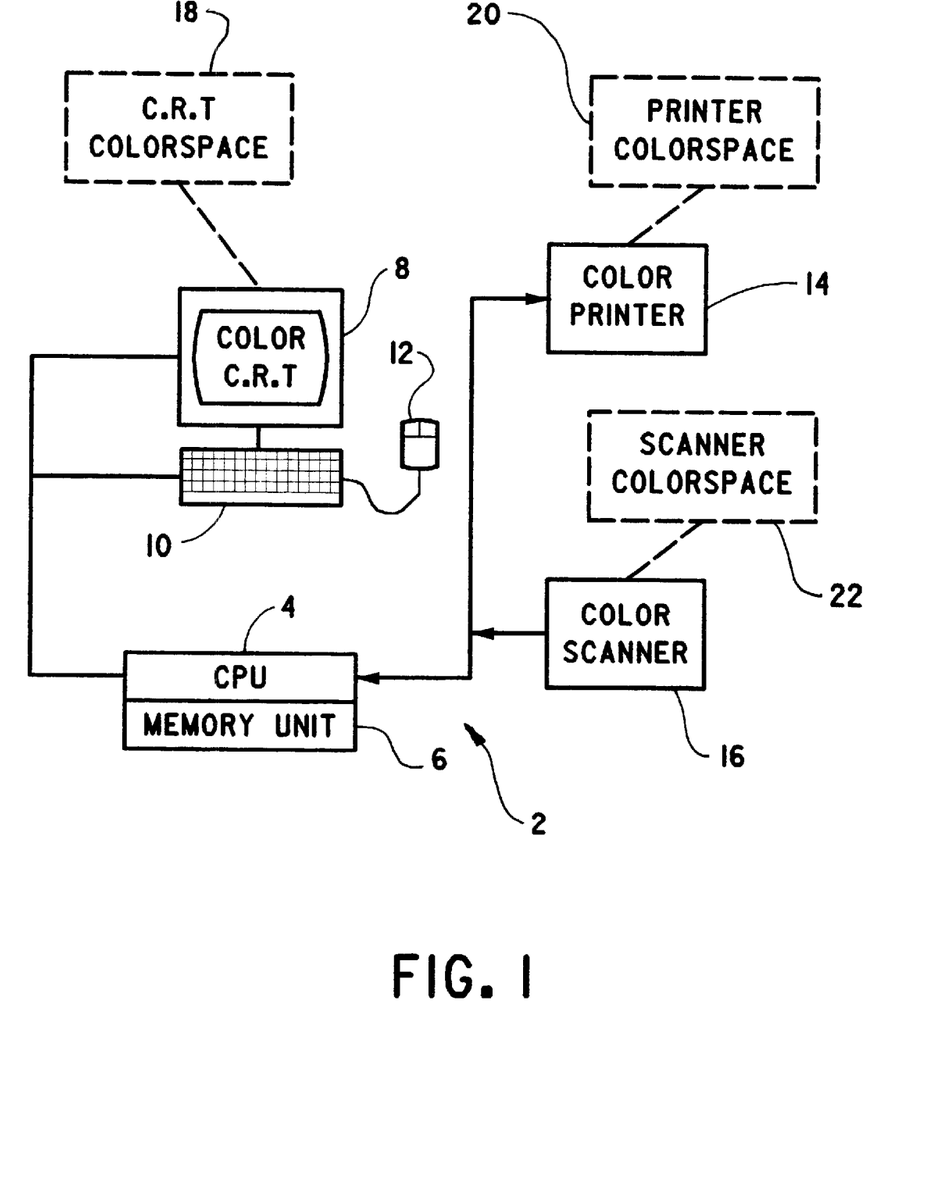
FIG. 1 is a schematic drawing of a computer system on which a software program operating in accordance with the present invention is installed.

With reference to FIG. 1, the present invention is a method for visualizing and manipulating one or more colors in one or more color spaces of devices, such as a CRT, a printer and/or a scanner. The method is embodied in a software program which is installed on a computer 2 which includes the necessary hardware and operating system software to implement the present invention.

The computer 2 includes a memory unit 6, a color CRT 8, a keyboard 10 and a mouse 12 connected to a central processing unit (CPU) 4 in a manner known in the art. The memory unit 6 stores the operating system software and the software program embodying the present invention. An output device, such as a color printer 14, and an input device, such as a color scanner 16, can also be connected to the CPU 4 in a manner known in the art.

The color CRT 8, color printer 14 and color scanner 16 can each produce colors in a color space defined by their respective capabilities. For example, color CRT 8 has a CRT color space 18 which is defined by the red, green and blue (RGB) color-producing characteristics of color CRT 8. Preferably, CRT color space 18 is an RGB color space, however, CRT color space 18 can be another color space. Similarly, color printer 14 and color scanner 16 define printer color space 20 and scanner color space 22 which preferably are a CMYK color space and an RGB color space, respectively. While the CRT color space 18 and the scanner color space 22 are both RGB color spaces, the RGB color space corresponding to CRT color space 18 can have different boundaries than the RGB color space corresponding to scanner color space 22.

Figure 2:
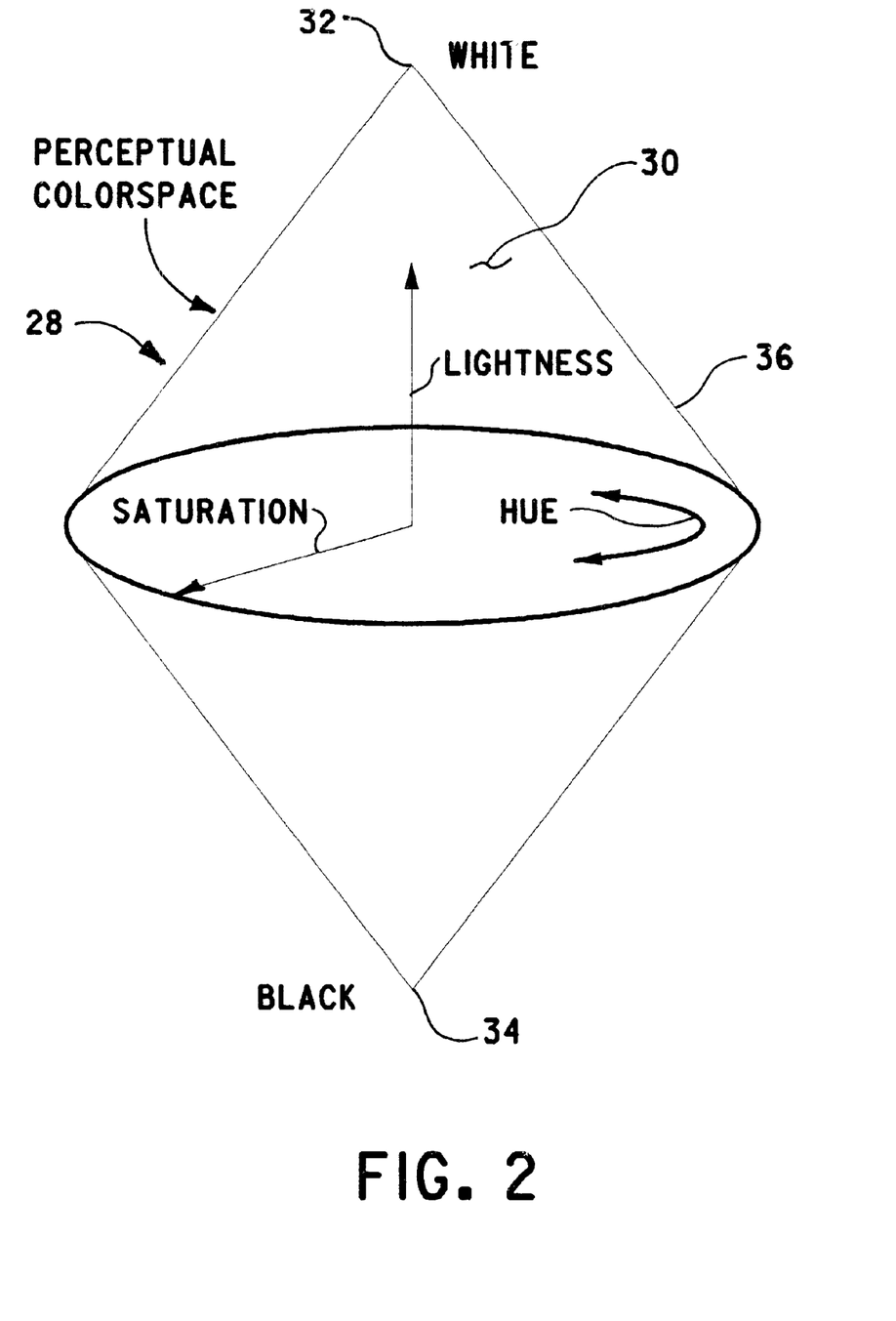
FIG. 2 is a schematic drawing of a three-dimensional, dual-cone perceptual color space.

The present invention utilizes well-known techniques for modeling particle systems to visualize and manipulate a color by itself or in relation to one or more other colors in the same color space or different color spaces. To enable such visualization and manipulation, the software program embodying the present invention converts CRT color space 18 from an RGB color space to a perceptual color space 28. A convenient model of perceptual color space 28 is shown in FIG. 2, however, perceptual color space 28 is not to be construed as limited by the model shown in FIG. 2. A perceptual color space 28 relates the physiological and neurological ways in which the eyes and brain receive and process color to a three-dimensional, dual-cone color space 30 having a point 32 representing the color white at one end thereof and a point 34 representing the color black at the other end thereof. A boundary 36 of the dual-cone color space 30 diverges conically from point 32 toward point 34 and diverges conically from point 34 to point 32. The diverging cones meet intermediate points 32 and 34.

FIGS. 3a and 3b through 13a and 13b show respective top and side views of perceptual color space 28 including particles C1–C4 therein which represent colors of an image (not shown), such as an image received on color scanner 16, which is preferably displayed, in whole or in part, on color CRT 8.

Figure 3A:
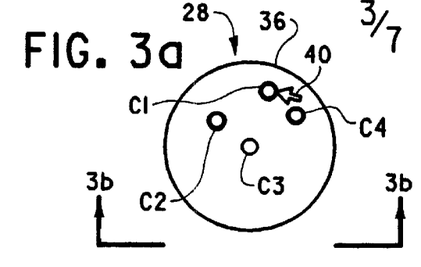
Figure 3B:
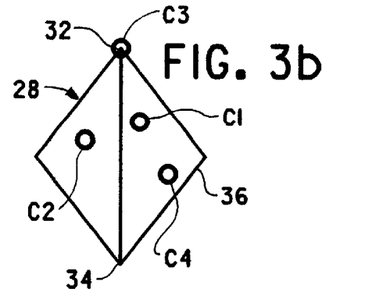

Referring to FIGS. 3a and 3b, in accordance with the present invention, if it is desired to change the color associated with particle C1 of the image without changing the colors associated with particles C2–C4, mouse 12 is manipulated to move a cursor 40 on color CRT 8 to point to the particle C1 in FIG. 3a. Particle C1 is then selected by activating (clicking) one of the buttons of mouse 12. Thereafter, dragging cursor 40 causes corresponding movement of particle C1.

Figure 4A:
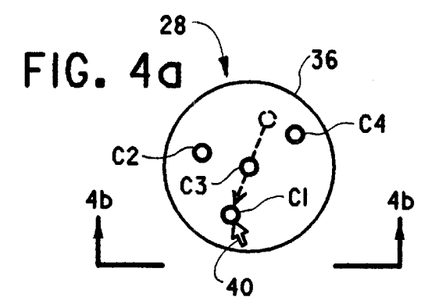
Figure 4B:
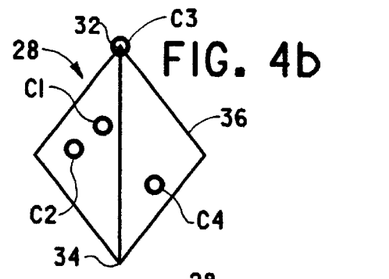

FIGS. 4a and 4b show the result of moving particle C1 to a position opposite the starting position of particle C1 in the saturation direction of perceptual color space 28. As a result of this change, the color associated with particle C1 changes from, for example, the color yellow in FIGS. 3a and 3b to the color light blue in FIGS. 4a and 4b.

In order to move particles in perceptual color space 28, particles C1–C4 are represented in the CPU 4 and memory unit 6 of computer 2 as a state vector which includes a plurality of scalar values which define the position particles C1–C4 in perceptual color space 28 and the colors associated with particles C1–C4. The plurality of scalar values includes groups of scalar values, with each group of scalar values representing the position of one of the particles C1–C4 in perceptual color space 28 and the color associated therewith.

After particle C1 is selected, moving cursor 40 via mouse 12 produces differences between the position of cursor 40 and particle C1. In response to any difference between the position of cursor 40 and particle C1, the software of the present invention determines an objective function which mathematically describes the difference therebetween. Next, the present invention determines a partial derivative of the objective function with respect to the state vector to obtain an objective vector 86. The objective vector 86 defines a change in the position of particle C1 which minimizes the difference between the position of cursor 40 and the position of particle C1. For movement of particle C1 absent a constraint (discussed hereinafter) imposed thereon, the objective vector 86 can be combined directly with the state vector to change the position of particle C1 to follow the path of cursor 40 in perceptual color space 28. More specifically, combining the state vector and the objective vector 86 changes a group of scalar values associated with particle C1. This change produces a change in the position of particle C1 and a change of the color represented by this group of scalar values. Hence, by simply pointing, clicking and dragging particle C1, the color associated therewith in the original image can be adjusted.

In the foregoing example, particle C1 was moved in the saturation-hue plane shown in FIGS. 3a and 4a. This movement also produced a change in the position of particle C1 in the saturation-lightness plane shown in FIGS. 3b and 4b. Alternatively, particle C1 can be moved from the position shown in the saturation-lightness plane of FIG. 3b to the position shown in the saturation-lightness plane of FIG. 4b by utilizing the point, click and drag method described above. The choice of moving particle C1 in the hue-saturation plane shown in FIGS. 3a and 4a or the saturation-lightness plane shown in FIGS. 3b and 4b, or both, will depend on the desired change of the color associated with particle C1.

Figure 5A:
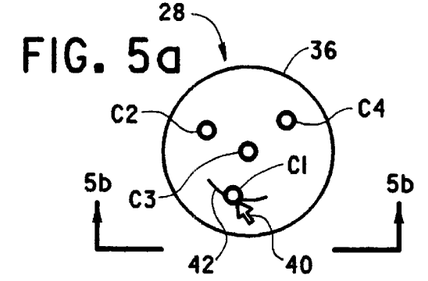
Figure 5B:
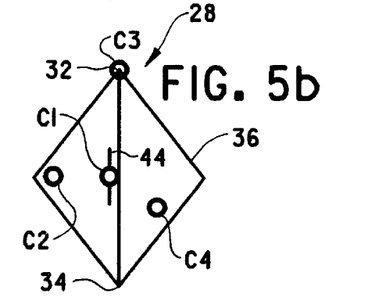
Figure 6A:
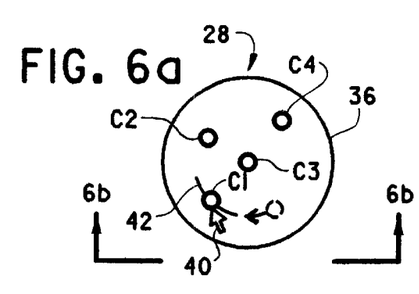
Figure 6B:
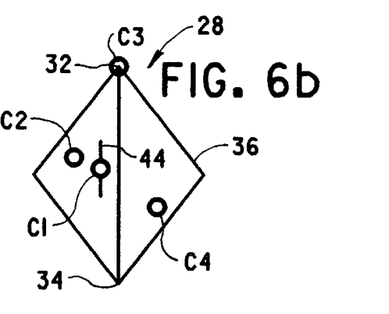
Figure 7A:
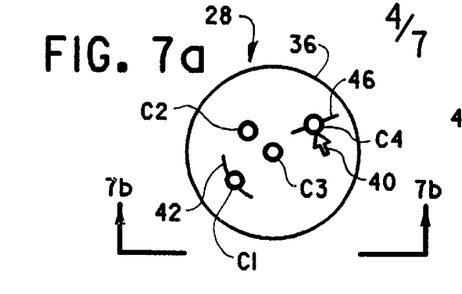
Figure 7B:
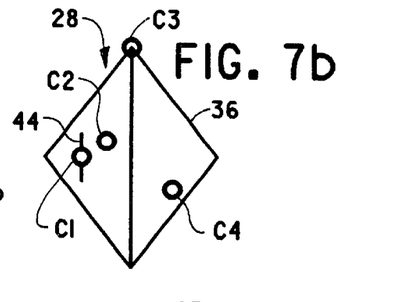

With reference to FIGS. 5a–6b, using the point, click and drag method discussed above, particle C1 is selected in FIG. 5a. Thereafter, utilizing keyboard 10 or mouse 12, a constraint is imposed on particle C1 that maintains the saturation constant in the hue-saturation plane. This constraint is shown in FIGS. 5a and 6a as a track 42 which is perpendicular to the disallowed direction of motion of particle C1 in the hue-saturation plane. This constraint is also shown in the saturation-lightness plane of FIGS. 5b and 6b as a line segment 44 which extends parallel to the lightness axis in perceptual color space 28. Line segment 44 is likewise perpendicular to the disallowed direction of motion of particle C1. In the views shown in FIGS. 5a–6b, track 42 and line segment 44 suggest directions of motion possible for particle C1 with the active saturation constraint imposed thereon.

To change the position of particle C1, and hence the color associated therewith, the position of particle C1 in FIG. 5a is changed utilizing the point, click and drag method described above whereby particle C1 is moved to the position shown in FIG. 6a. As discussed above, the present invention determines an objective function for the desired change of the group of scalar values corresponding to the change of particle C1 from the position shown in FIG. 5a to the position shown in FIG. 6a. The present invention also determines an objective vector 86 which defines a change to the group of scalar values for particle C1 which minimizes the objective function.

In addition, the present invention defines, for the constraint shown in FIGS. 5a–6b, a constraint function for the change in the position of particle C1 in FIGS. 5a and 6a. The constraint function mathematically defines one or more directions of disallowed motion of particle C1. The present invention then determines a partial derivative of the constraint function with respect to the first state vector to obtain therefor a constraint vector which defines at least one change in the first state vector which does not violate the saturation constraint. More specifically, the constraint vector is determined from a Jacobian matrix which is the partial derivative of the constraint function with respect to the first state vector and a LaGrange multiplier, in a manner well-known in the art of particle system modeling. Thereafter, in response to changing the position of cursor 40, the present invention solves the objective vector 86 and the constraint vector for changes in the position of cursor 40. The solutions of the objective vector 86 and the constraint vector are supplied to a non-linear solver software routine 72, shown schematically in FIG. 14, which determines a change to the group of scalar values for particle C1 which minimizes the objective function 84 without violating the saturation constraint. Preferably, the non-linear routine solver 72 is a fourth order Runge-Kutta algorithm which is well-known in the art of particle system modeling.

Hence, in response to movement of cursor 40 in the hue-saturation plane, objective vector 86 attempts to have particle C1 follow the movement of cursor 40 and the constraint vector prevents changes in the saturation direction of the hue-saturation plane shown in FIGS. 5a and 6a. Since particle C1 moves in the hue-saturation plane shown in FIGS. 5a and 6a, there are no changes to the lightness of the color associated with particle C1 in the saturation-lightness plane shown in FIGS. 5b and 6b. If it is desired to change the lightness of the color associated with particle C1, particle C1 can be selected in FIG. 5b and moved in the lightness direction along line segment 44.

With reference to FIGS. 7a–8b, a hue constraint is imposed on particle C4 and a saturation constraint is imposed on particle C1. In response to imposing these constraints, the present invention determines for particle C4 a hue constraint function and a hue constraint vector, and determines for particle C1 a saturation constraint function and a saturation constraint vector. In FIGS. 7a–8b, line segments 44 and 46 show directions of allowed motion of particle C1 with the saturation constraint imposed thereon and line segment 46 shows the direction of allowed motion of particle C4 with the hue constraint imposed thereon. Since the saturation-lightness planes shown in FIGS. 7b and 8b do not show hue, line segment 46 is only shown in the hue-saturation planes shown in FIGS. 7a and 7b.

Using the point, click and drag method, particle C4 is selected. Thereafter, in response to moving cursor 40 from the position shown in FIG. 7a to the position shown in FIG. 8a, the present invention determines an objective function 84 and objective vector 86 corresponding to changes in the position of cursor 40. Thereafter, the present invention determines for the change in position of cursor 40 solutions for the objective vector 86, the hue constraint vector and the saturation constraint vector and provides these solutions to the non-linear solver routine 72 which determines therefrom a change to the group of scalar values for particle C4. Since the saturation constraint vector is related to changes in the position of particle C1, the solution of the saturation constraint vector provided to the non-linear solver routine 72 for changes in the position of particle C4 does not produce a change to the group of scalar values for particle C1.

Figure 8A:
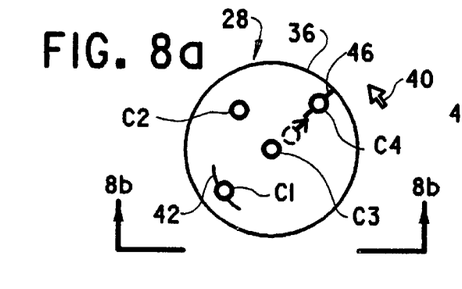
Figure 8B:
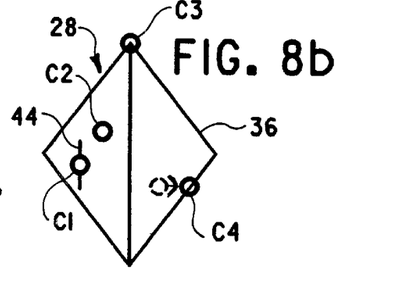

The present invention can also impose a boundary constraint when an attempt is made to move a particle, e.g., C4, outside of the perceptual color space 28. For example, as shown in FIGS. 8a and 8b, when particle C4 crosses boundary 36 of perceptual color space 28, the present invention imposes a boundary constraint on further changes to the saturation of the color associated with movement of particle C4 in a manner that violates the boundary 36 of perceptual color space 28. This boundary constraint is shown graphically in FIGS. 8a and 8b by cursor 40 being outside of the hue-saturation plane of FIG. 8a, and particle C4 is constrained by the intersection of particle C4 and boundary 36 in FIG. 8b and, thus remains inside the hue-saturation plane of FIG. 8a. In operation, once the non-linear solver routine 72 determines a change in the position of particle C4, the present invention determines if the new position of particle C4 is outside boundary 36. If not, the present invention permits the change in the position of particle C4. However, if the change in the position of particle C4 is outside boundary 36, the present invention determines when cursor 40 crossed boundary 36 and adjusts the group of scalar values for particle C4 to correspond to the position of cursor 40 when it crossed boundary 36. The boundary constraint restricts any subsequent attempted changes in the position of particle C4 outside boundary 36 while permitting changes to the position of particle C4 on or inside boundary 36.

In FIGS. 9a–10b, a lightness constraint is imposed on particle C2, a saturation constraint is imposed on particle C1 and a hue constraint is imposed on particle C4. In response to imposing these constraints, the present invention determines a lightness constraint function and a lightness constraint vector for particle C2, determines a saturation constraint function and a saturation constraint vector for particle C1, and determines a hue constraint function and a hue constraint vector for particle C4. Line segments 44 and 46 show directions of allowed motion of particle C1 with the saturation constraint imposed thereon, line segment 46 shows the direction of allowed motion of particle C4 with the hue constraint imposed thereon and line segment 48 shows the allowed direction of motion of particle C2 with the lightness constraint imposed thereon. Since the hue-saturation plane shown in FIGS. 9a and 10a do not include lightness, no line segment or track appears in connection with particle C2 therein.

Figure 9A:
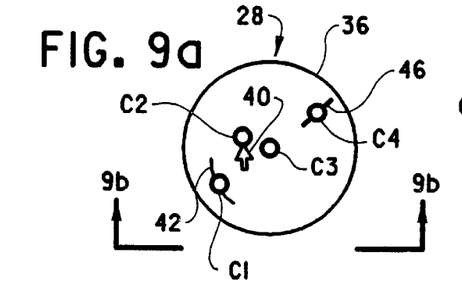
Figure 9B:
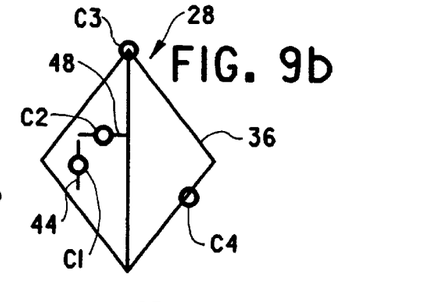
Figure 10A:
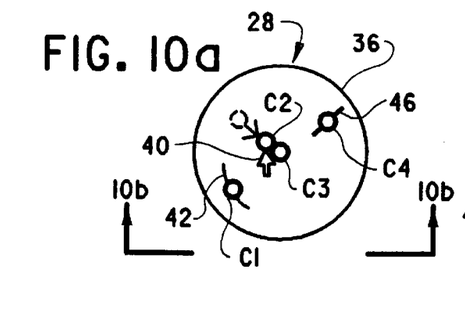
Figure 10B:
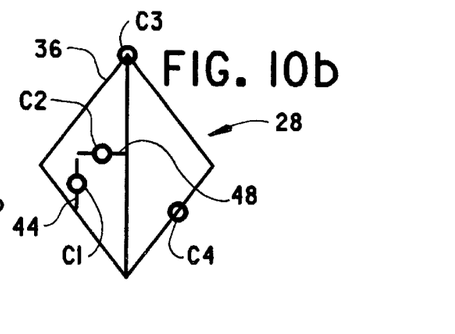
Figure 11A:
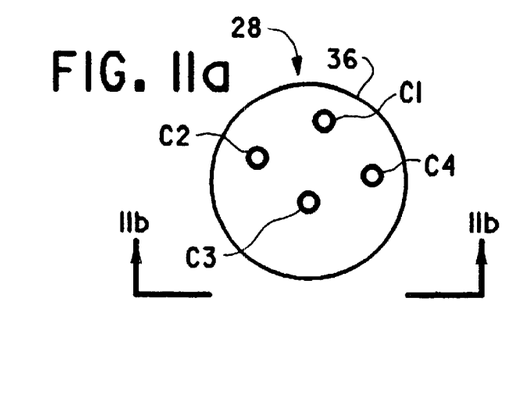
Figure 11B:
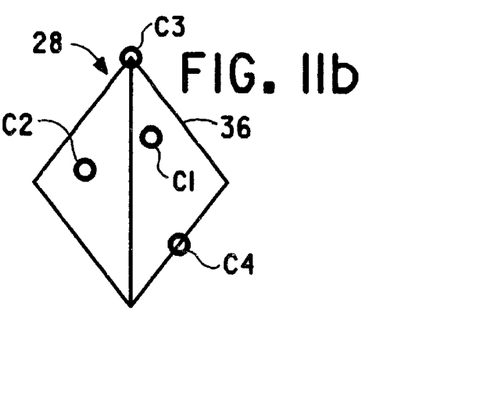
Figure 12A:
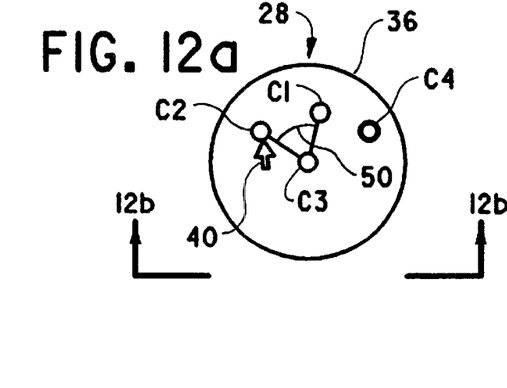
Figure 12B:
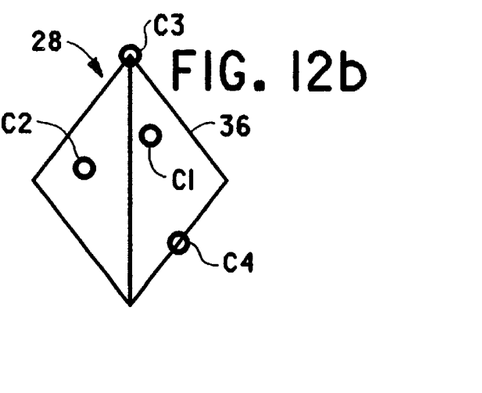
Figure 13A:
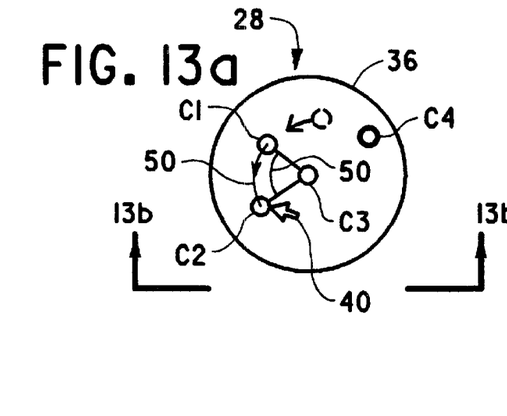
Figure 13B:
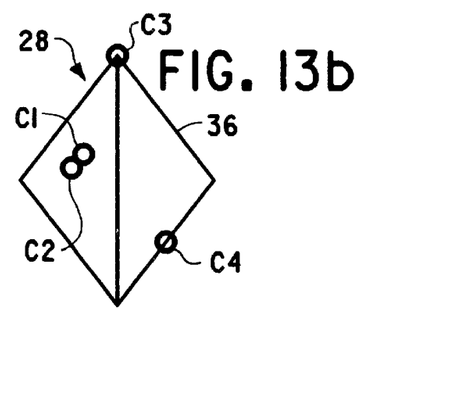

Using the point, click and drag method, particle C2 can be moved from the position shown in FIG. 9a to the position shown in FIG. 10a. More specifically, in response to changing the position of cursor 40, the present invention determines therefor an objective function 84 and an objective vector 86. The present invention determines solutions for the objective vector 86 and the lightness constraint vector for changes in the position of cursor 40 and provides the solutions to the non-linear solver routine 72 which determines therefrom a change of the group of scalar values for particle C2 which minimizes the objective function 84 without violating the lightness constraint imposed on particle C2.

Referring to FIGS. 11a–13b, particles C1–C4 are positioned in perceptual color space 28 at positions corresponding to the colors they represent in an image. The present invention determines a state vector which includes a plurality of scalar values which is defined by one or more groups of scalar values, with each group of scalar values associated with the position of one of the particles C1–C4. More specifically, the state vector includes a first group of scalar values which define the position of particle C1 in perceptual color space 28 and a second group of scalar values which define the position of particle C2 in perceptual color space 28. The positions of particles C3 and C4 are likewise defined by third and fourth groups of scalar values of the state vector.

In the example shown in FIGS. 12a–13b, a hue constraint is imposed between particles C1 and C2. In response to imposing this constraint, the present invention determines a hue constraint function, shown by angle 50 in FIGS. 12a and 13a, which constrains particles C1 and C2 to move simultaneously in the hue direction. Using the point, click and drag method, particle C2 is moved from the position shown in FIG. 12a to the position shown in FIG. 13a. In response to changing the position of cursor 40, the present invention determines an objective function 84, an objective vector 86 and a hue constraint vector. Next, the present invention determines solutions for the objective vector 86 and the hue constraint vector and provides the solutions to the non-linear solver routine 72 which determines changes for the first group of scalar values and the second group of scalar values which minimize the objective function 84 without violating the hue constraint imposed between particles C1 and C2.

Figure 14:
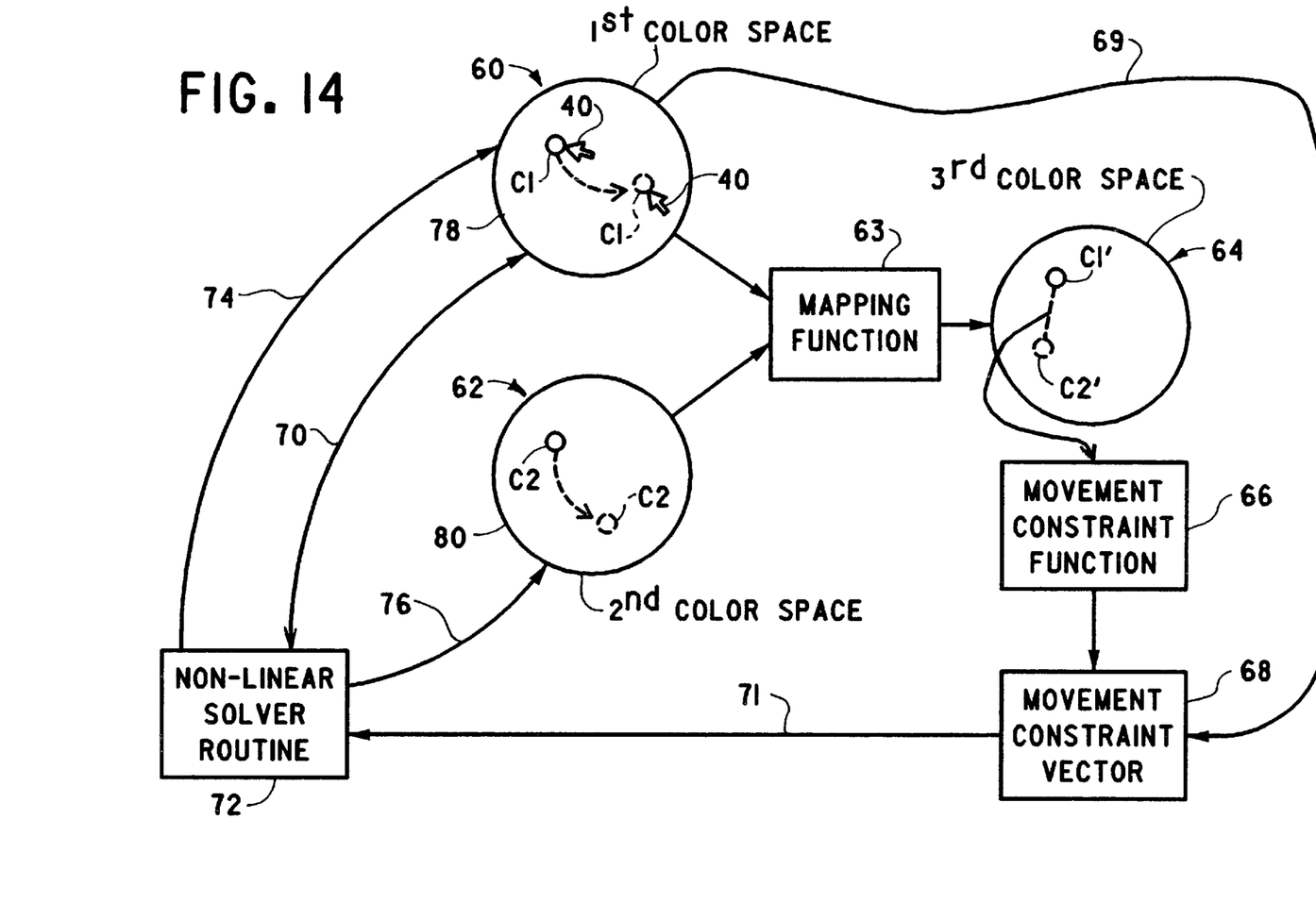
FIG. 14 is a diagrammatic representation of movement of colors in accordance with a constraint function imposed across two color spaces.

With reference to FIG. 14, in addition to being applied to a particle in a color space, constraint functions can also be applied between two or more color spaces. As shown in FIG. 14, a first hue-saturation color space 60 includes a particle C1 corresponding to a color of a first device, such as color printer 14, and a second hue-saturation color space 62 includes a particle C2 which corresponds to a color of a second device, such as color scanner 16.

In order to impose a constraint between particle C1 in first color space 60 and particle C2 in second color space 62, the present invention defines a state vector which includes a first plurality of scalar values corresponding to the position of particle C1 in first color space 60 and a second plurality of scalar values corresponding to the position of particle C2 in second color space 62. Next, at least one movement constraint is imposed between particle C1 in first color space 60 and particle C2 in second color space 62. In the example shown in FIG. 14, the movement constraint causes the position of particle C2 to change as a function of changes to the position of particle C1. In response to imposing this movement constraint, the present invention determines a movement constraint function 66 and a movement constraint vector 68 between particles C1 and C2.

Next, using the point, click and drag method, particle C1 is selected. Thereafter, in response to changing the position of cursor 40, the present invention determines an objective function 84 and an objective vector 86 for the movement of cursor 40. Next, the present invention solves the objective vector 86 and the constraint vector for changes in position of cursor 40 and provides the solutions to the non-linear solver routine 72. The non-linear solver routine 72 determines from these solutions changes to the first plurality of scalar values and the second plurality of scalar values which minimize the objective function 84 without violating the movement constraint imposed between particles C1 and C2. Hence, changes to the position of cursor 40 produces changes in the position of particle C1 and produces corresponding changes to the position of particle C2 with resulting changes to the colors associated with particles C1 and C2 in their respective color spaces.

A plurality of movement constraints can be imposed between particles C1 and C2 in FIG. 14. In addition, a hue, saturation and/or lightness constraint can be imposed on particle C1 or particle C2, or both. More specifically, any number of constraints can be imposed on particle C1 or C2, or between particles C1 and C2, or any other particles in the first and second color spaces 60 and 62, as required by the desired constraints or changes to corresponding colors in an image.

Preferably, the movement constraint function 66 is determined in a third color space 64. Specifically, the present invention includes a mapping function 63 which maps the first plurality of scalar values and the second plurality of scalar values corresponding to the position of particles C1 and C2 in the first and second color spaces 60 and 62, into a corresponding first plurality of scalar values and second plurality of scalar values, respectively, in a third device-neutral color space 64. For purpose of illustration, the mapping of the first and second pluralities of scalar values into the third color space 64 is shown in FIG. 14 by particles C1' and C2' in third color space 64. In response to imposing the movement constraint between particles C1 and C2 in the first and second color spaces 60 and 62, the present invention determines from the first and second pluralities of scalar values in the third color space 64, the movement constraint function and the movement constraint vector for particles C1 and C2.

Thereafter, in response to changing the position of cursor 40 in first color space 60, the present invention determines an objective function 84 and an objective vector for the change in position of cursor 40. Next, the present invention solves the objective vector and the movement constraint vector for the change in position of cursor 40 and provides these solutions to the non-linear solver routine 72 which determines therefrom the change in position of particle C1 in the first color space 60 and the corresponding change in position of particle C2 in second color space 62.

Once determined for particles C1' and C2', the movement constraint vector 68 can be utilized for subsequent changes in the position of particle C1. Specifically, the solutions of the objective vector and the constraint vector 68 are determined for each change in position of cursor 40. These solutions are then supplied to the non-linear solver routine 72 which determines therefrom the change in position of particle C1 in the first color space 60 and the corresponding change in position of particle C2 in second color space 62. Hence, the multiple color transforms between the first and second color spaces are avoided.

Supplying the change in position of cursor 40 to the movement constraint vector 68 is shown in FIG. 14 by line 69 extending from first color space 60 to the movement constraint vector 68. The present invention solves the movement constraint vector 68 for each change in the position of cursor 40. Supplying the solutions of the objective vector and the constraint vector to the non-linear solver routine 72 is shown in FIG. 14 by lines 70 and 71 from first color space 60 and constraint vector 68, respectively, to non-linear solver routine 72. Lastly, application of the solution of the linear solver routine 72 to change the positions of particles C1 and C2 is shown in FIG. 14 by lines 74 and 76 from non-linear solver routine 72 to first color space 60 and second color space 62, respectively.

If changes to the position of cursor 40 would result in particle C1 or C2 crossing a boundary 78 of first color space 60 or a boundary 80 of second color space 62, the present invention would impose a boundary constraint on the movement thereof in order to avoid changes in the position of particle C1 or C2 outside color space 60 or 62. A boundary constraint imposed on one of particles C1 and C2 would be likewise imposed on the other of particles C1 and C2 regardless of which particle C1 or C2 cursor 40 was attempting to move.

Figure 15:
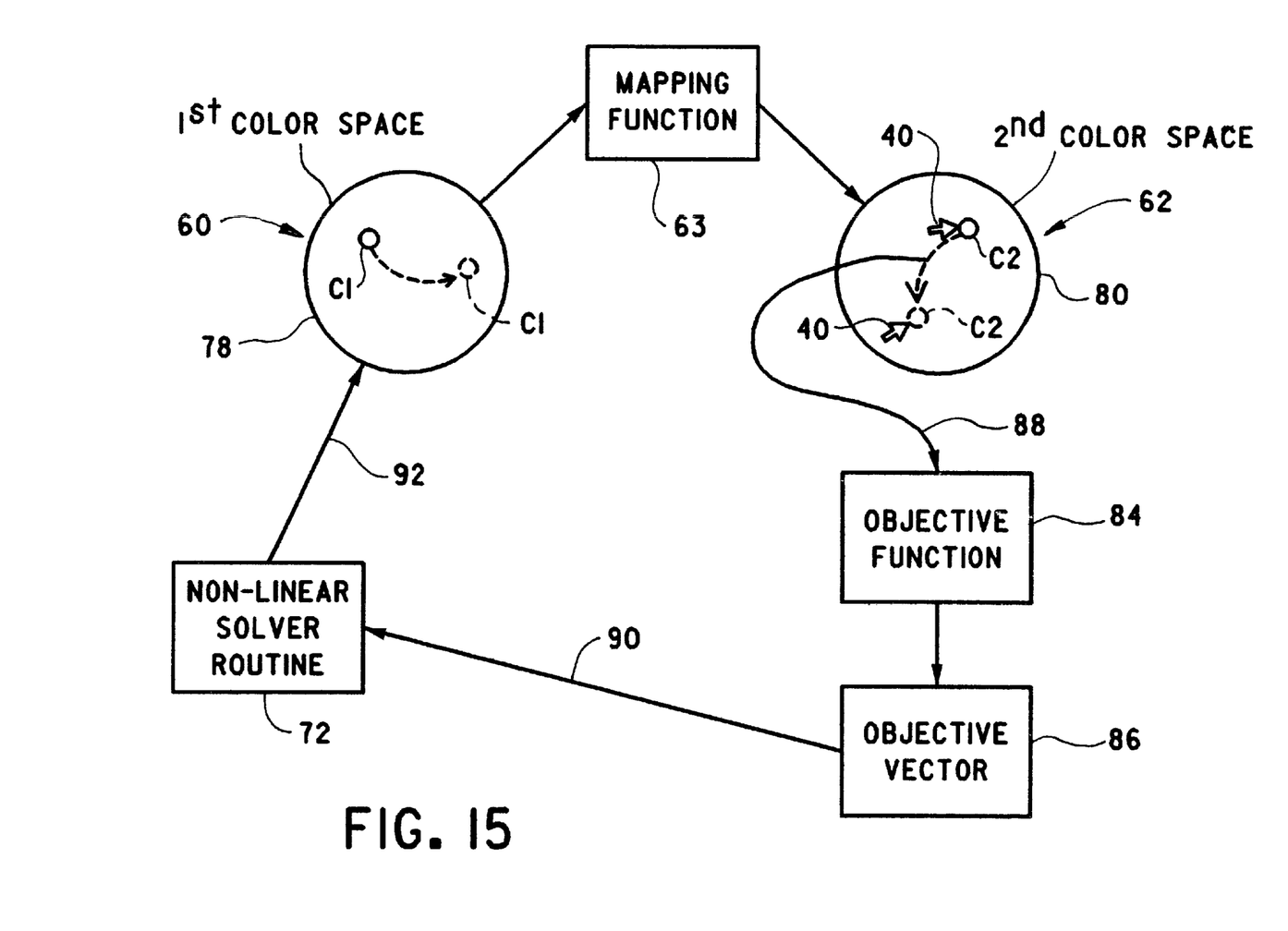
FIG. 15 is a diagrammatic representation of movements of colors in accordance with an objective function imposed across two color spaces.

With reference to FIG. 15, one or more objective functions 84 can also be imposed between two or more color spaces. To impose an objective between particle C1 in first color space 60 and particle C2 in second color space 62, the present invention defines a state vector which includes a first plurality of scalar values corresponding to the position of particle C1 in first color space 60. Thereafter, the present invention utilizes mapping function 63 to map the first plurality of scalar values corresponding to the position of particle C1 in first color space 60 into a second plurality of scalar values in second color space 62 corresponding to the position of a particle C2 therein. Particle C2 in second color space 62 defines a second color therein corresponding to the first color in the first color space 60.

Next, using the point, click and drag method, particle C2 is selected. Thereafter, in response to changing the position of cursor 40 from the position shown in solid line to the position shown in dashed line, the present invention determines an objective function 84 for a change of the second plurality of scalar values corresponding to the change in position of cursor 40. Next, the present invention determines from the objective function 84 an objective vector 86 which defines a change to the state vector, i.e., the first plurality of scalar values, which minimizes the objective function 84. Specifically, the present invention determines a partial derivative of the objective function 84 with respect to a derivative of the state vector to obtain the objective vector 86. Then, the state vector and the objective vector 86 are combined to obtain a change in the position of particle C1 in first color space 60 corresponding to the change in position of particle C2 in second color space 62. More specifically, the present invention solves the objective vector 86 for the change in position of cursor 40 and provides this solution to non-linear solver routine 72 which determines therefrom the change to be applied to the first scalar values to change the position of particle C1 in first color space 60 corresponding to the change in position of particle C2 in second color space 62.

Determining the objective function 84 for each change in the position of cursor 40 is shown in FIG. 15 by a line 88 extending between second color space 62 and objective function 84. Supplying the solution of the objective vector 86 to the non-linear solver routine 72 is shown in FIG. 15 by a line 90 from objective vector 86 to non-linear solver routine 72. Lastly, application of the solution of the non-linear solver routine 72 to change the position of particle C1 is shown in FIG. 15 by a line 92 from non-linear solver routine 72 to first color space 60.

Constraints and objectives can be applied in one color space or between two or more color spaces utilizing one or more of the methods discussed above in connection with FIGS. 3a–15. The objectives and/or constraints imposed on one or more particles are chosen based on desired movement of the one or more particles and any constraints to such movement in one or more color spaces.

As can be seen, the present invention utilizes techniques applicable to particle system modeling and, more specifically, to the constrained motion of particles in a particle system to produce changes in one or more colors in one or more color spaces represented by a computer. The present invention reduces the number of color transforms needed to change a color in two or more color spaces and provides a method for relating two or more colors in a color space so that a change to one color produces a corresponding change to the other related colors. While the present invention has been described as a method, the software program implementing the present invention is installed and operates on hardware of computer 2. Hence, computer 2 includes appropriate means for implementing the software program of the present invention.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A method of adjusting a color in a color space, the method comprising the steps of:
   (a) determining a state vector including a first plurality of scalar values which define a first color in a first color space;
   (b) determining an objective function for a desired change of the first plurality of scalar values;
   (c) determining a partial derivative of the objective function with respect to a derivative of the state vector to obtain an objective vector, wherein the objective vector defines a change to the first plurality of scalar values which minimizes the objective function; and
   (d) combining the objective vector and the state vector to obtain the desired change of the first color.

2. The method as set forth in claim 1, further including the step of mapping the first plurality of scalar values in the first color space to a first plurality of scalar values in a second color space to define a second color therein, wherein:
   the second color corresponds to the first color; and
   the objective function in step (b) is determined for the desired change in the first plurality of scalar values in the second color space.

3. The method as set forth in claim 1, further including the steps of:
   imposing a constraint on changes to the first plurality of scalar values;
   determining a constraint function and a constraint vector corresponding to the imposed constraint;
   determining a partial derivative of the constraint vector with respect to the state vector, the partial derivative defining a change to the state vector which does not violate the constraint function; and
   changing the first plurality of scalar values as a function of the desired change to the first plurality of scalar values and as a function of the constraint vector.

4. The method as set forth in claim 1, further including the steps of:
   (e) including in the state vector a second plurality of scalar values which define a second color in a second color space;
   (f) determining a constraint function between the first plurality of scalar values and the second plurality of scalar values;
   (g) determining a partial derivative of the constraint function with respect to the state vector to obtain therefor a constraint vector which defines a change to the state vector which does not violate the constraint function; and
   (h) changing the second plurality of scalar values as a function of the desired change to the first plurality of scalar values and as a function of the constraint vector whereby the second color changes as a function of the change of the first color.

5. The method as set forth in claim 4, wherein:
   step (f) includes the steps of:
   (i) mapping the first plurality of scalar values into a third color space;
   (ii) mapping the second plurality of scalar values into the third color space; and
   (iii) determining the constraint function between the first plurality of scalar values and the second plurality of scalar values in the third color space, wherein the partial derivative of step (g) includes determining the partial derivative with respect to the mappings of steps (f)(i) and (f)(ii).

6. A method of adjusting color in a color space, the method comprising the steps of:
   (a) defining a first color in a first color space;
   (b) defining a second color in a second color space;
   (c) transforming the first color in the first color space into a corresponding first color in a third color space;
   (d) transforming the second color in the second color space into a corresponding second color in the third color space;
   (e) defining a constraint between the first color in the third color space and the second color in the third color space;
   (f) changing the first color in the first color space; and
   (g) causing the second color in the second color space to change as a function of the change to the first color in the first color space and as a function of the constraint.

7. The method as set forth in claim 6, further including the steps of:
   (h) determining a partial derivative of the constraint with respect to the first and second colors in the respective first and second color spaces;
   (i) determining from the partial derivative of the constraint at least one change in the first and second colors in the respective first and second color spaces which does not violate the constraint; and
   (j) changing the second color in the second color space as a function of the change to the first color in the first color space and as a function of the at least one change.

8. The method as set forth in claim 6, wherein the second color in the second color space corresponds to the first color in the first color space.

9. A method of adjusting a color in a color space, the method comprising the steps of:
   determining a state vector including a first plurality of scalar values corresponding to a first color in a first color space;
   determining an objective function for a desired change of the first plurality of scalar values corresponding to a desired change of the first color;
   determining from the objective function an objective vector, wherein the objective vector defines a change to the state vector which minimizes the objective function;
   combining the state vector and the objective vector to obtain the desired change to the first color;
   imposing a constraint on changes to the first plurality of scalar values;

determining a constraint function and a constraint vector corresponding to the imposed constraint;

determining a partial derivative of the constraint vector with respect to the state vector, the partial derivative defining a change to the state vector which does not violate the constraint function; and changing the first plurality of scalar values as a function of the desired change to the first plurality of scalar values and as a function of the constraint vector.

10. A method of adjusting a color in a color space, the method comprising the steps of:

(a) determining a state vector including a first plurality of scalar values corresponding to a first color in a first color space;

(b) determining an objective function for a desired change of the first plurality of scalar values corresponding to a desired change of the first color;

(c) determining from the objective function an objective vector, wherein the objective vector defines a change to the state vector which minimizes the objective function;

(d) combining the state vector and the objective vector to obtain the desired change to the first color;

(e) determining a color space constraint function between the first plurality of scalar values and a second plurality of scalar values of the state vector, the second plurality of scalar values defining a second color in the first color space;

(f) determining from the color space constraint function a color space constraint vector which defines a change in the state vector which does not violate the constraint function; and (g) changing the second plurality of scalar values as a function of the change to the first plurality of scalar values and as a function of the color space constraint vector whereby the second color changes as a function of the change to the first color.

11. The method as set forth in claim 10, further including the steps of:

(h) including in the state vector a third plurality of scalar values which define a third color in a second color space;

(i) determining a movement constraint function between the first plurality of scalar values and the third plurality of scalar values;

(j) determining for the movement constraint function a movement constraint vector which defines at least one change in at least one of the first and third pluralities of scalar values which does not violate the movement constraint function; and (k) changing the third plurality of scalar values as a function of the change to the first plurality of scalar values and as a function of the movement constraint vector whereby the third color changes as a function of the change to the first color.

12. The method as set forth in claim 11, wherein:
step (i) includes the steps of:
(1) mapping the first plurality of scalar values into a third color space;
(2) mapping the third plurality of scalar values into a third color space;
(3) determining the movement constraint function between the first plurality of scalar values and the third plurality of scalar values in the third color space; and determining the movement constraint function with respect to the mappings in steps (i)(1) and (i)(2).

13. The method as set forth in claim 11, wherein:

step (c) includes determining a partial derivative of the objective function with respect to a desired change of the first plurality of scalar values;

step (f) includes determining a partial derivative of the color space constraint function with respect to the state vector to obtain therefor the corresponding color space constraint vector; and step (j) includes determining a partial derivative of the movement constraint function with respect to the state vector to obtain therefor the corresponding movement constraint vector.

14. The method as set forth in claim 12, wherein:

step (g) the first color and the second color change relative to the first color space in a manner defined by the color space constraint function; and step (k) the first color and the third color change in their respective first color space and second color space in a manner defined by the movement constraint function determined in the third color space.

15. An apparatus for adjusting a color in a color space, the apparatus comprising:

state vector determining means for determining a state vector including a first plurality of scalar values which define a first color in a first color space;

objective function determining means for determining an objective function for a desired change of the first plurality of scalar values;

objective vector determining means for determining a partial derivative of the objective function with respect to a derivative of the state vector to obtain an objective vector, wherein the objective vector defines a change to the first plurality of scalar values which minimizes the objective function; and combining means for combining the objective vector and the state vector to obtain the desired change of the first color.

16. The apparatus as set forth in claim 15, further including mapping means for mapping the first plurality of scalar values in the first color space to a first plurality of scalar values in a second color space to define a second color therein, wherein:

the second color corresponds to the first color; and the objective function determining means determines the objective function for the desired change in the first plurality of scalar values in the second color.

17. The apparatus as set forth in claim 15, further including:

imposing means for imposing a constraint on changes to the first plurality of scalar values;

constraint determining means for determining a constraint function and a constraint vector corresponding to the imposed constraint;

partial derivative determining means for determining a partial derivative of the constraint vector with respect to the state vector, the partial derivative defining a change to the state vector which does not violate the constraint function; and changing means for changing the first plurality of scalar values as a function of the desired change to the first plurality of scalar values and as a function of the constraint vector.

18. The apparatus as set forth in claim 15, further including:

state vector including means for including in the state vector a second plurality of scalar values which define a second color in a second color space;

constraint function determining means for determining a constraint function between the first plurality of scalar values and the second plurality of scalar values;

constraint vector determining means for determining a partial derivative of the constraint function with respect to the state vector to obtain therefor a constraint vector which defines a change in the state vector which does not violate the constraint function; and changing means for changing the second plurality of scalar values as a function of the desired change to the first plurality of scalar values and as a function of the constraint vector whereby the second color changes as a function of the change of the first color.

19. The apparatus as set forth in claim 18, wherein:

the constraint function determining means maps the first plurality of scalar values into a third color space;

the constraint function determining means maps the second plurality of scalar values into the third color space; and the constraint function is determined between the first plurality of scalar values and the second plurality of scalar values in the third color space, wherein the constraint vector determining means determines the partial derivative of the mapping of the first and second pluralities of scalar values in the third color space.

20. An apparatus for adjusting a color in a color space, the apparatus comprising:

state vector determining means for determining a state vector including a first plurality of scalar values corresponding to a first color in a first color space;

objective function determining means for determining an objective function for a desired change of the first plurality of scalar values corresponding to a desired change of the first color;

objective vector determining means for determining from the objective function an objective vector, wherein the objective vector defines a change to the state vector which minimizes the objective function;

combining means for combining the state vector and the objective vector to obtain the desired change of the first color;

imposing means for imposing a constraint on changes to the first plurality of scalar values;

constraint determining means for determining a constraint function and a constraint vector corresponding to the imposed constraint;

partial derivative determining means for determining a partial derivative of the constraint vector with respect to the state vector, the partial derivative defining a change to the state vector which does not violate the constraint function; and changing means for changing the first plurality of scalar values as a function of the desired change to the first plurality of scalar values and as a function of the constraint vector.

21. An apparatus for adjusting a color in a color space, the apparatus comprising:

state vector determining means for determining a state vector including a first plurality of scalar values corresponding to a first color in a first color space;

objective function determining means for determining an objective function for a desired change of the first plurality of scalar values corresponding to a desired change of the first color;

objective vector determining means for determining from the objective function an objective vector, wherein the objective vector defines a change to the state vector which minimizes the objective function;

combining means for combining the state vector and the objective vector to obtain the desired change of the first color;

color space constraint function determining means for determining a color space constraint function between the first plurality of scalar values and a second plurality of scalar values of the state vector, the second plurality of scalar values defining a second color in the first color space;

color space constraint vector determining means for determining from the color space constraint function a color space constraint vector which defines a change in the state vector which does not violate the constraint function; and changing means for changing the second plurality of scalar values as a function of the change to the first plurality of scalar values and as a function of the color space constraint vector whereby the second color changes as a function of the change to the first color.

22. The apparatus as set forth in claim 21, further comprising:

including means for including in the state vector a third plurality of scalar values which define a third color in a second color space;

movement constraint determining means for determining at least one movement constraint function between the first plurality of scalar values and the third plurality of scalar values; and movement constraint vector determining means for determining for the movement constraint function a movement constraint vector which defines at least one change in at least one of the first and third pluralities of scalar values which does not violate the movement constraint function, wherein the changing means changes the third plurality of scalar values as a function of the change to the first plurality of scalar values and as a function of the movement constraint vector whereby the third color changes as a function of the change to the first color.

23. The method as set forth in claim 22, wherein:

the movement constraint determining means (1) maps the first plurality of scalar values into a third color space, (2) maps the second plurality of scalar values into a third color space, and (3) determines the movement constraint function between the first plurality of scalar values and the third plurality of scalar values in the third color space; and the movement constraint vector determining means determines the movement constraint function with respect to the mappings of the first and second pluralities of scalar values in the third color space.

24. The method as set forth in claim 23, wherein:

the objective vector determining means determines a partial derivative of the objective function with respect to a desired change of the first plurality of scalar values;

the color space constraint vector determining means determines a partial derivative of the color space constraint function with respect to the state vector to obtain therefor the corresponding color space constraint vector; and the movement constraint vector determining means determines a partial derivative of the movement constraint function with respect to the state vector to obtain therefor the corresponding movement constraint vector.

25. The method as set forth in claim 24, wherein:

the changing means changes the first color and the second color relative to the first color space in a manner defined by the color space constraint function; and the changing means changes the first color and the third color in their respective color spaces in a manner defined by the movement constraint function determined in the third color space.

* * * * *